June 11, 1935. H. W. PLEISTER ET AL 2,004,480
BOLT ANCHOR
Filed Oct. 9, 1934 3 Sheets-Sheet 1
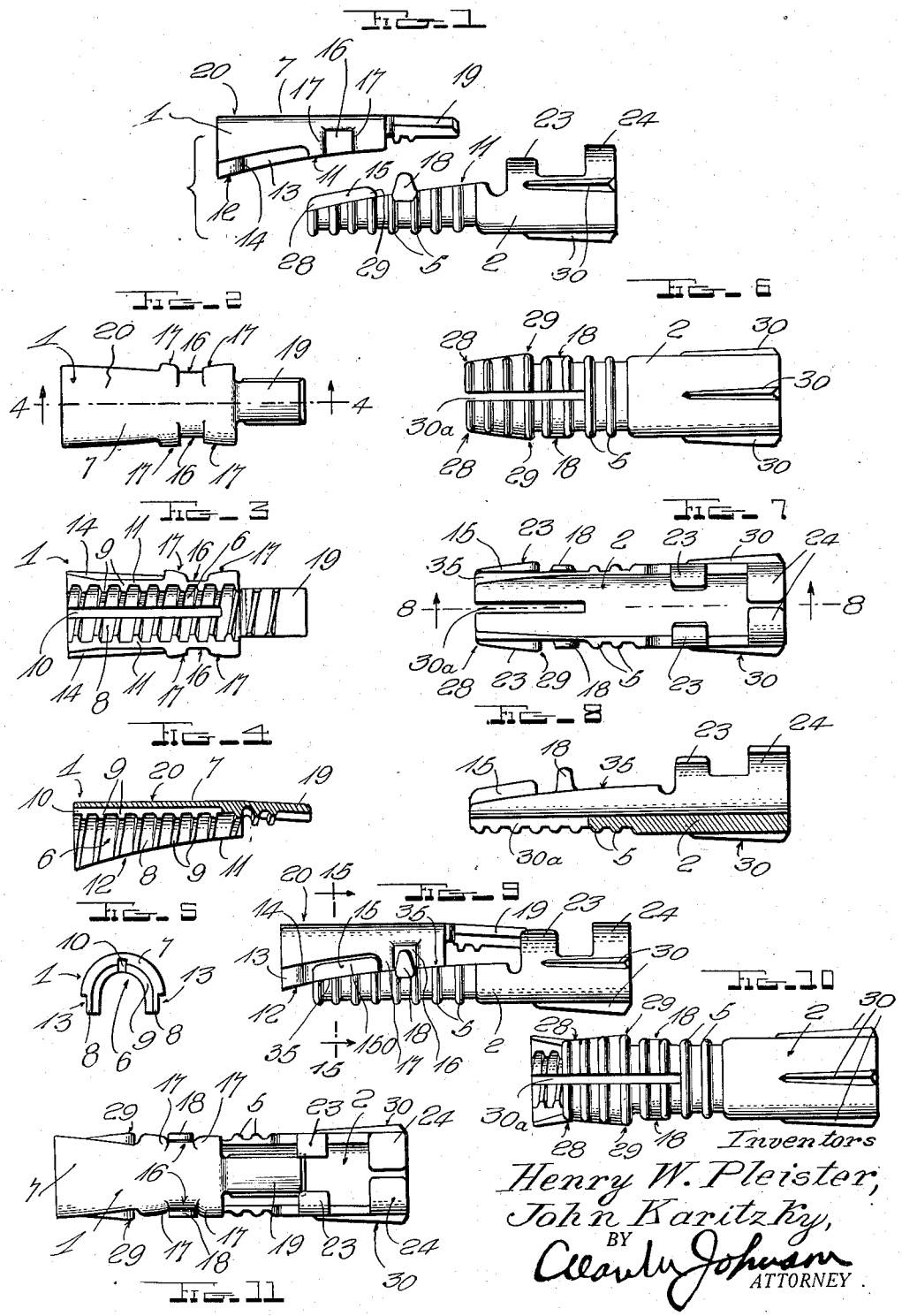
Inventors
Henry W. Pleister,
John Karitzky,
BY
Charles Johnson
ATTORNEY

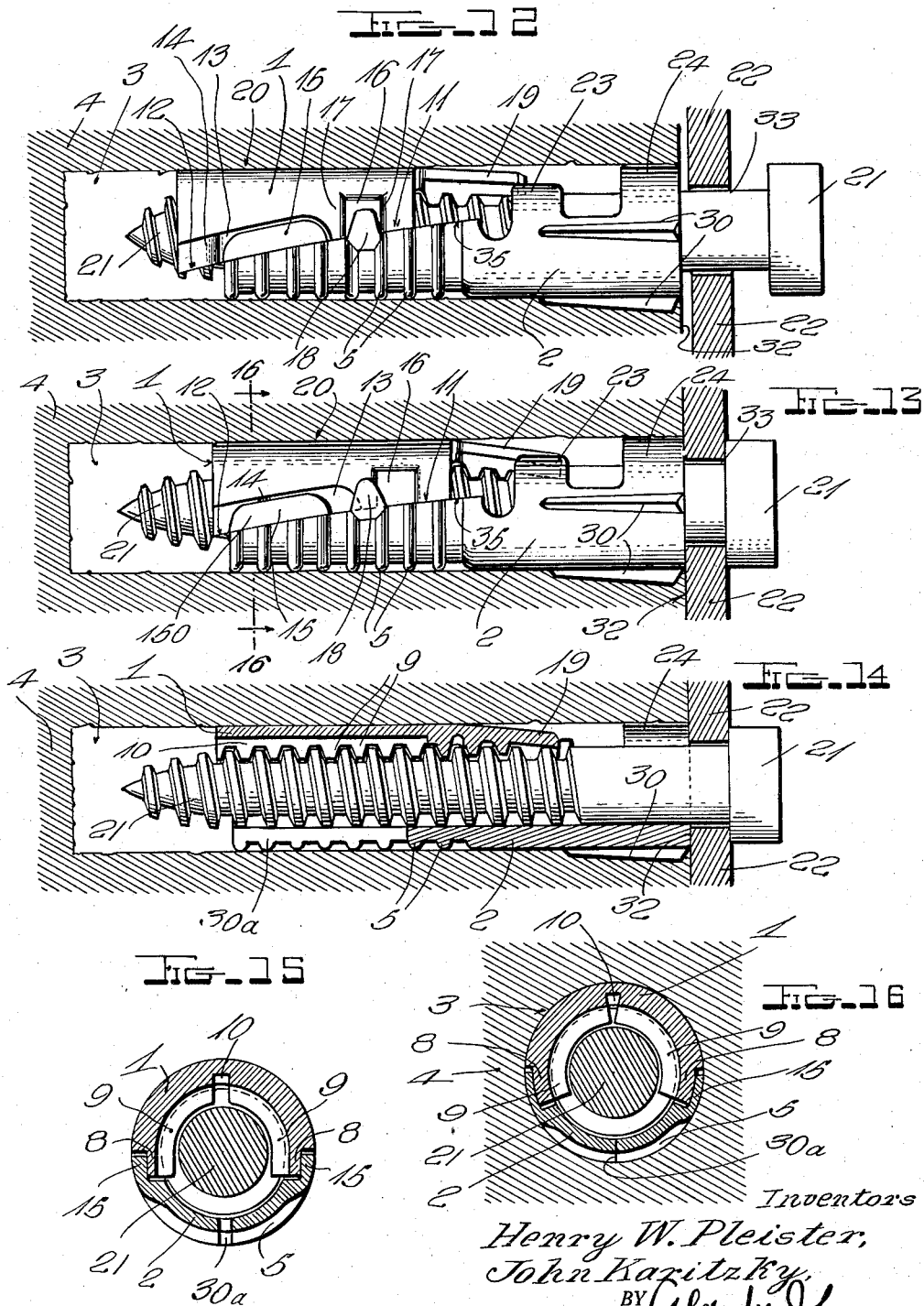

June 11, 1935. H. W. PLEISTER ET AL 2,004,480
BOLT ANCHOR
Filed Oct. 9, 1934 3 Sheets-Sheet 3
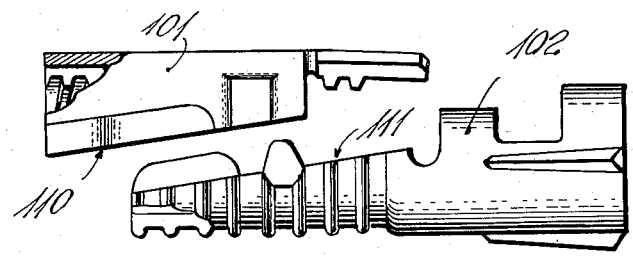
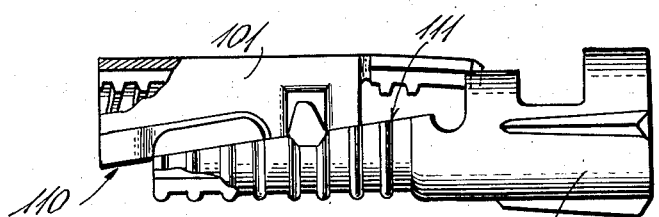
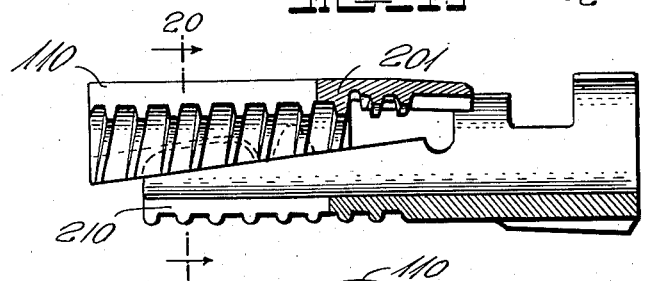
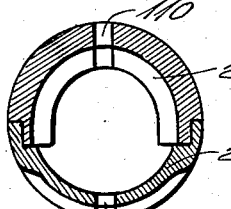
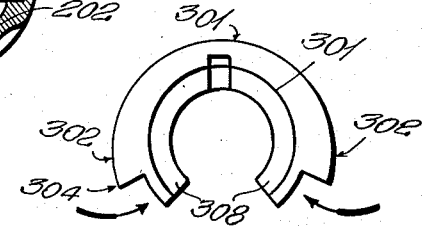
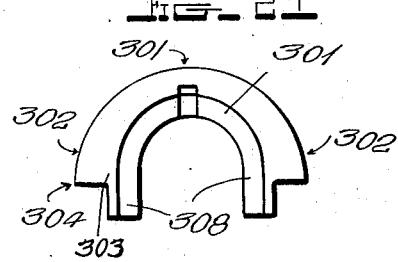
Inventors
Henry W. Pleister,
John Karitzky,
BY
ATTORNEY Patented June 11, 1935

2,004,480

UNITED STATES PATENT OFFICE 2,004,480

BOLT ANCHOR

Henry W. Pleister, Westfield, and John Karitzky, Garwood, N. J., assignors to Henry B. Newhall Corporation, Garwood, N. J., a corporation of New Jersey Application October 9, 1934, Serial No. 747,612

12 Claims. (Cl. 85—2.4)

Our invention relates to bolt anchors.

Our invention further relates to such a bolt anchor in which the maximum grip or bond will be towards the end of the hole, removed from the surface of the support, to prevent chipping or marring of the surface of the wall or other support.

Our invention more particularly relates to a bolt anchor having a shield formed of a plurality of shield members, having cooperating inclined surfaces adapted to slide longitudinally upon each other in situ, to obtain, for a given size bolt anchor shield, the maximum grip or bond with the walls of a hole in which it is mounted.

Our invention comprises such a bolt anchor which can be successfully operated without regard to the exact length of a screw, or other expanding member, to be used with a particular length of shield members; and without regard to the thickness of the part of the work to be secured.

Our invention further covers such a shield formed of a plurality of parts, in which one of the parts is provided with means to anchor, or resist movement in a hole, while its cooperating shield member is provided with a smooth exterior surface, to permit its movement in situ.

Our invention further covers such a shield provided with means to compress the shield, when it is forced or driven into a hole having a diameter somewhat less than the greatest or overall diameter of the bolt anchor, to insure greater area of engagement between the shield and the expanding member which is usually a lag or other screw. This increases the hold or grip of the lag, or other screw, with the shield, and prevents stripping of the cooperating means carried by the shield, which means are usually female threads in one of the shield members.

Our invention further covers such a shield provided with weakening means such, as a groove or slot, or similar means, to permit more ready compression of one or more of the shield members as the shield is driven into a hole, thereby eliminating, or lessening, any chipping or marring of the surface of the masonry or other wall as the shield is driven home.

Our invention further covers arcuate bearing surfaces between the members of the shield to insure that the greatest expansion occurs at the inner end of the hole removed from the surface of the wall so as to still further prevent chipping or marring of the wall adjacent the hole.

Our invention further covers a shield member formed of some rigid metal, such as malleable iron, cast in an ordinary sand mold without the use of a core; and, then, subsequently compressing or distorting the shield, as in driving it into a hole, so that its mutilated female threads will more closely partially surround the male thread on the lag screw, or other expanding member, thereby preventing the female threads, carried by the shield, from being stripped when an excessive load is placed upon the bolt anchor.

Our invention further relates to certain combinations, sub-combinations, articles of manufacture and details of construction, all of which will be more fully hereinafter described and pointed out in the claims.

In the figures we have shown different embodiments of our invention, the same reference numerals refer to similar parts in the several figures:

Fig. 1 is a side elevation of our bolt anchor shield formed of two shield members 1 and 2 shown in juxtaposition.

Fig. 2 is a plan view of the shield member 1.

Fig. 3 is a bottom view of the shield member 1.

Fig. 4 is a vertical section on line 4—4 of Fig. 2.

Fig. 5 is an end view of Fig. 2.

Fig. 6 is a bottom plan view of the shield section 2.

Fig. 7 is a plan view of the shield section 2.

Fig. 8 is a longitudinal vertical section on line 8—8 of Fig. 7.

Fig. 9 is a side elevation of our improved bolt anchor shield with the parts secured together for handling, shipping and transportation.

Fig. 10 is a reversed plan view of the shield illustrated in Fig. 9.

Fig. 11 is a plan view of the shield of Fig. 9.

Fig. 12 is a side elevation of our bolt anchor driven into a hole of slightly less diameter than the maximum or overall diameter of the shield, showing the shield compressed or distorted by the size of the hole which is usually in masonry, brick, concrete, terra cotta, or similar hard material.

Fig. 13 is a side elevation similar to Fig. 12, showing the lag screw screwed home to expand the bolt anchor and showing the work secured to the face of the wall.

Fig. 14 is a longitudinal vertical section through Fig. 13.

Fig. 15 is a cross section, on an enlarged scale, on line 15—15 of Fig. 9 before the shield is driven into a hole.

Fig. 16 is a cross section on line 16—16 of Fig. 13, showing the compression or distortion of the shield members after the shield is driven into the hole.

Figs. 17 and 18 illustrate a modification in which the shield members 101 and 102 are illustrated in side elevation and in juxtaposition in Fig. 17. In Fig. 18 the shield members are secured together.

Fig. 19 is a longitudinal vertical section of a further modification, in which the shield members 201 and 202 are each provided with weakening slots.

Fig. 20 is a cross section on line 20—20 of Fig. 19.

Fig. 21 is a fragmentary view of a still another modification in which the slidable shield member 301 is provided with an inclined or wedge-shape thickened end, so that it, together with its complementary fixed shield member, (not shown) will have a greater overall diameter than that of the hole in which it is to be mounted.

Fig. 22 is a view similar to Fig. 21 after the moveable shield member is distorted or compressed by driving the shield member 301, together with its complementary fixed shield member (not shown) into a hole of less diameter than the overall diameter of said two shield members.

Our shield is ordinarily meant to be used in holes drilled, or otherwise formed, in masonry, brick, terra cotta, concrete or similar hard material. While it is adapted to be used in holes into which it fits freely, so that no hammering or forcing of the shield is required to drive it home into the hole, it is meant primarily to be used in holes which have diameters slightly less than the overall diameter of the shield.

By our invention we cheapen the cost of manufacture in that the shield members can both be cast in ordinary sand molds without a core, and are then, subsequently, by hand, or preferably simply by driving them into a hole of less diameter than their overall diameter, caused to be distorted or compressed, so that a portion of the shield members are caused to change their shape. In the example shown, shield 2 is compressed to a smaller diameter and, through the ship lap, will, in turn, compress the slidable shield member 1. When the slidable shield member 1 is compressed, more or less, its mutilated female threads will more closely encircle the male threads of the lag, or other screw, thereby increasing the area of the mutilated female threads in contact with the male threads of the lag screw, so that a maximum load, for a given size bolt anchor, may be supported without fear of stripping the female threads in the moveable shield member.

This also permits a smaller hole to be drilled in the support, which reduces the cost of installation.

Other advantages will be apparent to those skilled in the art from the detailed description of the forms of our invention illustrated, by way of example, but to which our invention is not to be limited except as defined by our claims.

In the preferred form of our invention our bolt anchor shield is formed, preferably, of two members 1 and 2. The former is a movable shield member and the latter is a fixed shield member, in that after being once placed or forced into a hole 3 in a wall 4, the member 2 is held rigid in situ by any suitable means, as by its ribs 5, 5 biting into the side of the hole 3.

The slidable shield member 1 is provided with an open bottom 6, Fig. 5, an arched or semi-circular top 7 and parallel sides 8, 8 and with female threads 9 and, preferably, though not necessarily, with weakening means, such as a groove 10, all cast at the same time in a sand mold without the aid of a core.

The sides 8, 8 with their mutilated female screw threads 9 are cast parallel because if they were cast as a circular continuation of the semi-circular top 7, it would be impossible to withdraw the pattern from the sand without ruining the mold.

It would accordingly be necessary to provide the pattern with a core print in which latter an expensive core made of baked sand and molasses or similar plastic cementitious mixture be placed individually in each impression in the sand to form the interior female threads. This would require a core being made for each individual casting, which core would be destroyed when the hard casting was later removed from the sand and greatly multiply the cost of the casting.

To insure sale of such articles it is necessary that they be of the maximum strength for any given size bolt anchor, and, in addition, that their merchandizing be at such a low figure that they can be economically sold and used.

This slidable shield member 1 is also provided with an inclined wedge surface 11, preferably arcuate, as shown at 12, Figs. 12 and 13, for a purpose to be more fully hereinafter described.

It is also preferably provided with one portion 13 of a ship lap guide. This portion 13 has an inclined surface 14, Fig. 12, to cooperate with the complementary portion 15 of the ship lap guide. This portion 15 is mounted on the fixed shield member 2, see Figs. 1, 7, 9, 12 and 13.

The shield member 1 is also provided with two shallow grooves 16, 16 having slightly inclined surfaces 17, 17 to receive bendable fastening lugs 18, 18 on the shield member 2, to hold the shield members 1 and 2 together, Fig. 9, for packing, handling and transportation. This shield member 1 is also preferably, though not necessarily, provided with a tongue 19 for a purpose to be more fully hereinafter described. It is also provided with a smooth surface 20 on the exterior of its top 7, to permit it to be readily moved into its expanded position by the lag or other screw 21, see Fig. 13.

The complementary fixed shield member 2 is provided with transverse ribs 5, 5 to hold it fast in situ. It is also provided with guide lugs 23, 23 to cooperate with a tongue 19, if such tongue be used, and also with head lugs 24, 24 which form a head for the complete bolt anchor shield. The axial bore of the members 1 and 2 is untapered. The axial bore of the shield member 2 is unthreaded.

Our shield is provided with compression means to compress or distort the parallel sides 8, 8 of the shield member 1 with its female threads 9, from the cast position, Figs. 5 and 15, to the position shown in Fig. 16 where the former parallel sides 8, 8 with their mutilated female threads 9, are made to encircle, more or less, the male thread of the lag or other screw 21, thereby insuring greater contact area between the mutilated female threads 9 of the slidable shield member 1 and the male threads of the lag screw 21. When an excessive load is put upon the shield through the lag or other screw, the increased engaging area between the male threads and the mutilated female threads 9, will prevent stripping of the latter and insures safety of the work 22.

Various forms of compression means may be employed. In the drawings shown, by way of example, the compression means, in the preferred construction, consist of compression members 15, 15, which, in this preferred form, are part of the ship lap guide between the two members 1 and 2.

These compression and ship lap guide members are formed tapered, their smaller diameter 28 being at their inner end. Their greatest diameter is at 29, see Figs. 6, 10 and 11.

Our bolt anchors are meant primarily to be used in holes 3 of the minimum diameter for the particular size bolt anchor. For example, in holes of a diameter sufficient to receive the minimum diameter 28 of the compression ship lap guide members 15 but not to readily receive the larger portion of the compression members having the enlarged diameter which we have designated at 29.

In use the shield members 1 and 2 are secured together by the bendable fastening lugs 18, 18 as shown in Figs. 9, 10 and 11, and are handled, transported and shipped in the position shown in these figures.

At the job, the bolt anchor shield comprising the parts 1 and 2, Figs. 9, 10 and 11, are forced into hole 3 in the support 4 by hammering or otherwise exerting pressure on the head lugs 24, 24. The longitudinally extending ribs 30, 30 with the transverse ribs 5, 5 hold the shield member 2 non-movably in the hole.

In forcing the shield into the hole the compression members, which for convenience in manufacture are also the ship lap guide members 15, 15 engage the sides of the hole whose diameter is slightly less than the greatest diameter of the compression members at point 29, 29. This causes the compression ship lap members 15, 15 to be compressed or distorted inward. This compression is communicated to the parallel sides 8, 8, Figs. 5 and 15 of the movable shield member 1, and causes those sides to also move inward, more or less, so that they, with their mutilated female threads, will partially encircle, more or less, the male threads on the lag or other screw Fig. 21. This insures a greater area of contact between the mutilated female threads 9 of the moveable shield member 1 and the male threads of the lag or other screw, with the advantages previously set forth at length herein.

To more easily permit this crimping, compression, or distortion we preferably, though not necessarily, employ weakening means. Such weakening means may be in one or both of said shield members 1 and 2. For purposes of illustrating, we have shown a weakening groove 10 in the slidable shield member 1, Figs. 3, 5, 15 and 16, and a weakening slot 30 in the non-moveable shield member 2, see Figs. 6, 7, 10, 15 and 16.

As previously noted, these weakening means may be omitted, or may be varied. We have illustrated one variation in the modification illustrated in Fig. 19, wherein the shield members 201 and 202 have weakening slots 110 and 210 respectively.

After the shield is hammered home in the hole the work 22 of any character to be supported, is brought adjacent to the surface 32 of the wall or other support. The lag or other screw is then passed through a hole 33 in the work, and thence into the bolt anchor shield. The fixed shield member 2 being unthreaded, the lag screw passes freely along its non-tapered bore. It then engages with the female threads 9 of the moveable shield 1. Further rotation of the lag, or other screw, after the head of the screw has been brought up tight against the work, causes the moveable shield member 1 to move towards the work 22, the holding lugs 18, 18 slipping out of the grooves 16, 16.

This longitudinal movement of the moveable member 1 towards the work causes the arcuate inclined surface 12 of the moveable shield member 1 to slide up the incline arcuate surface 35 of the non-moveable shield member 2, which will cause the shield member 1 to move radially, with relation to the axial bore of the bolt anchor, into its expanded operative position. The arcuate surfaces provide a steeper angle of contact at the inner end of the shield which in turn provides a greater expansion at that end than at the forward end for the same amount of travel of the shield member 1 on the shield member 2.

It is also to be noted that by employing the arcuate inclined surfaces 12 and 35, practically all the strains and stresses, due to the expansion of the shield, will occur at or near the inner end of the hole, removed from the surface 32 of the wall or other support. This insures that the surface around the hole will not be chipped or marred by expanding the bolt anchor.

We preferably, though not necessarily, use a tongue 19, though it may be omitted. When used, it cooperates with the guide lugs 23, 23, and when the shield is fully expanded the tongue is bent down and becomes a lock engaging with the male thread of the lag or other screw and preventing accidental disengagement of the lag screw and the shield, see Fig. 13.

It will also be noted that the engaging surfaces 14 and 15 of the ship lap guide and compression members cooperate in the expanding of the shield, see Fig. 13.

Instead of employing arcuate inclined bearing surfaces to expand the shield members we may use straight wedge surfaces 110 on the movable shield member 101, Figs. 17 and 18, to cooperate with the complementary straight wedge surface 111 on the fixed shield member 102.

Various forms of compression members may, of course, be used. One such form is illustrated in Figs. 21 and 22, wherein the compression member is formed on the movable shield member 301, which shield member is similar to the shield member 1 in the other figures, except that the compression members are formed by thickening and tapering the walls of the end of the sliding member at 302. This taper increases from 303 to 304; the latter indicating the greatest or over-all diameter of the sliding member 301. As this modification is hammered into a hole, the action is the same as in the other forms, the tapered thickness 304 at the end of the sliding shield member causing the parallel portions 308, 308 to be bent, compressed or distorted into the position shown in Fig. 22, so that the mutilated threads on said member will engage a greater area of the male threads of the lag or other screw, and prevent stripping of the mutilated female threads in the movable shield member when an excessive load is thrown upon the shield, thereby preventing failure of the bolt anchor.

While we have described the shield member being compressed, crimped or distorted by the act of driving them into a hole in which the shield is to be employed, it is of course to be understood, that this bending or crimping or compressing may be done by hand or by a machine before they are placed in a hole. This operation would require additional work and, therefore, would be more expensive.

Having thus described this invention in connection with different illustrative embodiments thereof, to the details of which we do not desire to be limited, which is claimed as new and what is desired to secure by Letters Patent is set forth in the appended claims.

What we claim is:

1. The combination in a bolt anchor of an expanding shield formed of a plurality of parts, one of which is movable and another is normally non-movable, the movable shield member being provided with mutilated female threads, only a portion of which are normally adapted to engage with the male threads of an expanding screw, and compression means adapted to compress the shield and bring all portions of the mutilated female threads into engagement with the male threads of an expanding screw to prevent failure of the bolt anchor under an excessive load.

2. The combination of a bolt anchor shield formed of two slidable shield members, a ship lap connecting the members, an inclined surface between the members, and means to cause one of said shield members to slide upon the other.

3. The combination of a bolt anchor shield formed of two slidable shield members, a ship lap connecting the members, inclined surfaces between the members, means to cause one of said shield members to slide upon the other, and weakening means to permit the shield to be compressed or distorted.

4. In a bolt anchor provided with means to engage with an expanding member the anchor carrying means to increase the area of engagement between said first means and the expanding member to prevent failure of the bolt anchor when an excessive load is placed upon it.

5. In a bolt anchor provided with means to engage with an expanding member, the anchor carrying means adapted to automatically increase the area of engagement between said first means and the expanding member as the bolt anchor is driven into a hole in which it is to be expanded, to prevent failure of the bolt anchor when an excessive load is placed upon it.

6. The combination in a bolt anchor of an expanding member provided with male threads and a shield provided with mutilated female threads, the shield carrying means to increase the area of engagement between the female threads of the shield and the male threads of the expanding member.

7. The combination in a bolt anchor of an expanding member provided with male threads and a shield provided with mutilated female threads, the shield carrying means to automatically increase the area of engagement between the female threads of the shield and the male threads of the expanding member when the shield is driven into a hole in which it is to be expanded, to prevent stripping when an excessive load is thrown upon the bolt anchor.

8. In a bolt anchor provided with means to engage with an expanding member the anchor being provided with integral means to increase the area of engagement between said first means and the expanding member to prevent failure of the bolt anchor when an excessive load is placed upon it.

9. In a bolt anchor formed of a plurality of longitudinally slidable parts, two of the slidable parts having open sides, one of the open sides being substantially U-shape in cross-section and having substantially parallel sides, and means carried by the bolt anchor to cause said substantially parallel sides to assume a more or less circular contour when the bolt anchor is driven into a hole.

10. In a bolt anchor formed of a plurality of longitudinally slidable parts, two of the slidable parts having open sides, the interior of one of the slidable parts being unthreaded and the interior of the other slidable part being provided with female threads and being formed substantially U-shape in cross-section with substantially parallel sides, and means carried by the bolt anchor to cause said substantially parallel sides to assume a more or less circular contour when the bolt anchor is driven into a hole, thereby permitting a greater area of its female threads to engage with a lag or other expanding screw, to prevent stripping when an excessive load is thrown on the bolt anchor.

11. In a bolt anchor formed of a plurality of longitudinally slidable parts, two of the slidable parts having open sides, one of the open sides being substantially U-shape in cross-section and having substantially parallel sides, and integral means carried by the bolt anchor to cause said substantially parallel sides to assume a more or less circular contour when the bolt anchor is driven into a hole.

12. In a bolt anchor formed of a plurality of longitudinally slidable parts, two of the slidable parts having open sides, the interior of one of the slidable parts being unthreaded and the interior of the other slidable part being provided with female threads and being formed substantially U-shape in cross-section with substantially parallel sides, and integral means carried by the bolt anchor to cause said substantially parallel sides to assume a more or less circular contour when the bolt anchor is driven into a hole, thereby permitting a greater area of its female threads to engage with a lag or other expanding screw, to prevent stripping when an excessive load is thrown on the bolt anchor.

HENRY W. PLEISTER.
JOHN KARITZKY.